United States Patent
Li et al.

(10) Patent No.: US 11,431,226 B2
(45) Date of Patent: Aug. 30, 2022

(54) GENERATOR AND WIND TURBINE

(71) Applicant: XINJIANG GOLDWIND SCIENCE & TECHNOLOGY CO., LTD., Urumqi (CN)

(72) Inventors: Jinhui Li, Beijing (CN); Junwei Liu, Beijing (CN); Wenhua Xu, Beijing (CN)

(73) Assignee: XINJIANG GOLDWIND SCIENCE & TECHNOLOGY CO., LTD., Urumqi (CN)

( * ) Notice: Subject to any disclaimer, the term of this patent is extended or adjusted under 35 U.S.C. 154(b) by 123 days.

(21) Appl. No.: 16/766,671

(22) PCT Filed: Jan. 4, 2019

(86) PCT No.: PCT/CN2019/070442
§ 371 (c)(1),
(2) Date: May 22, 2020

(87) PCT Pub. No.: WO2020/048073
PCT Pub. Date: Mar. 12, 2020

(65) Prior Publication Data
US 2020/0373812 A1      Nov. 26, 2020

(30) Foreign Application Priority Data
Sep. 6, 2018 (CN) .......................... 201811037781.6

(51) Int. Cl.
*H02K 9/04* (2006.01)
*F03D 9/25* (2016.01)
(Continued)

(52) U.S. Cl.
CPC ................. *H02K 9/04* (2013.01); *F03D 9/25* (2016.05); *F03D 80/60* (2016.05); *H02K 1/16* (2013.01);
(Continued)

(58) Field of Classification Search
CPC .. H02K 9/04; H02K 9/26; H02K 1/16; H02K 1/187; H02K 1/20; H02K 1/2786;
(Continued)

(56) References Cited

U.S. PATENT DOCUMENTS

2006/0001269 A1* 1/2006 Jansen ................... H02K 21/22
290/44
2010/0026110 A1   2/2010 Harb et al.
(Continued)

FOREIGN PATENT DOCUMENTS

CN         87102423 A      10/1987
CN        101473514 A       7/2009
(Continued)

OTHER PUBLICATIONS

Translation of EP 1586769 A2 (Year: 2005).*
(Continued)

*Primary Examiner* — Sean Gugger
(74) *Attorney, Agent, or Firm* — Bayes PLLC

(57) ABSTRACT

The disclosure relates to a generator and a wind turbine. The generator includes an active cooling loop and a passive cooling loop that are isolated from each other and both are in communication with external environment. The active cooling loop includes cavities that are in communication with each other and located at two respective ends of the generator in an axial direction, an air gap between a rotor and a stator of the generator, and radial channels arranged at intervals and distributed along the axial direction of the stator. A cooling device in communication with the external environment is disposed in the active cooling loop. The passive cooling loop includes an axial channel extending through the stator in the axial direction and an outer surface of the generator.

19 Claims, 6 Drawing Sheets

(51) Int. Cl.
*F03D 80/60* (2016.01)
*H02K 1/16* (2006.01)
*H02K 1/18* (2006.01)
*H02K 1/20* (2006.01)
*H02K 1/2786* (2022.01)
*H02K 1/30* (2006.01)
*H02K 7/18* (2006.01)
*H02K 9/26* (2006.01)
*H02K 21/22* (2006.01)

(52) U.S. Cl.
CPC .............. *H02K 1/187* (2013.01); *H02K 1/20* (2013.01); *H02K 1/2786* (2013.01); *H02K 1/30* (2013.01); *H02K 7/1838* (2013.01); *H02K 9/26* (2013.01); *H02K 21/22* (2013.01); *F05B 2220/706* (2013.01); *F05B 2260/20* (2013.01)

(58) Field of Classification Search
CPC ........ H02K 1/30; H02K 7/1838; H02K 21/22; F03D 9/25; F03D 80/60; F05B 2220/706; F05B 2260/20
See application file for complete search history.

(56) References Cited

U.S. PATENT DOCUMENTS

| | | | |
|---|---|---|---|
| 2011/0210560 | A1 | 9/2011 | Mancuso et al. |
| 2011/0260467 | A1* | 10/2011 | Gudewer ................ H02K 9/04 290/1 B |

FOREIGN PATENT DOCUMENTS

| | | | |
|---|---|---|---|
| CN | 101728901 | A | 6/2010 |
| CN | 102246395 | A | 11/2011 |
| CN | 102265487 | A | 11/2011 |
| CN | 102725945 | A | 10/2012 |
| CN | 102738913 | A | 10/2012 |
| CN | 102761201 | A | 10/2012 |
| CN | 101728899 | B | 9/2013 |
| CN | 103280903 | A | 9/2013 |
| CN | 105553182 | A | 5/2016 |
| CN | 106640554 | A | 5/2017 |
| CN | 106655564 | A | 5/2017 |
| CN | 107612172 | A | 1/2018 |
| CN | 207766098 | U | 8/2018 |
| EP | 1586769 | A2 * | 10/2005 .............. H02K 1/20 |
| EP | 1586769 | A2 | 10/2005 |
| EP | 3236065 | A1 | 10/2017 |
| SU | 997184 | A1 | 2/1983 |

OTHER PUBLICATIONS

First Office Action issued in corresponding Australian Application No. 2019335165, dated Mar. 9, 2021 (5 pages).
First Office Action issued in corresponding Indian Application No. 202017020870, dated Jun. 30, 2021 (6 pages).
Second Office action issued in corresponding Chinese Application No. 201811037781.6, dated Jan. 1, 2020 (7 pages).
Extended European Search Report issued in corresponding European Application No. 19858460.9, dated Jun. 22, 2021 (9 pages).
International Search Report and Written Opinion in corresponding PCT Application No. PCT/CN2019/070442, dated Jun. 3, 2019, 14 pages.
First Office action issued in corresponding Chinese Application No. 201811037781.6, dated Aug. 21, 2019, 8 pages.
Office Action issued in corresponding European Application No. 19858460.9, dated Mar. 24, 2022 (4 pages).

* cited by examiner

GENERATOR AND WIND TURBINE

CROSS-REFERENCE TO RELATED APPLICATIONS

This application is a National Phase of International Application No. PCT/CN2019/070442, filed on Jan. 4, 2019, which is based on and claims priority to Chinese Patent Application No. 201811037781.6, entitled "GENERATOR AND WIND TURBINE" and filed on Sep. 6, 2018, each of which is incorporated herein by reference in its entirety.

FIELD

The present disclosure relates to the technical field of cooling, and in particular, to a generator and a wind turbine.

BACKGROUND

With development of the wind power market, wind turbine development gradually shows a tendency of high power density. Among many cooling methods for a wind turbine, air cooling has been widely used in the field of wind turbine cooling due to its advantages of high reliability, easy maintenance and no pollution. Depending on whether the cooling medium in the cooling loop relies on powered drive device to maintain the circulating flow in the cooling loop, the cooling method can be divided into passive cooling (no powered drive device) and active cooling (having powered drive device).

The passive cooling in the air cooling method can simplify the structure of the wind turbine, but its cooling capacity in a limited space is insufficient. Active cooling is gradually gaining ground due to its superior cooling capacity and greater design freedom. With the increasing power generation capacity of a single wind turbine, the power, volume, weight and cost of active cooling equipment have risen, which makes layout, installation and maintenance more difficult and less reliable. As a result, high power density wind turbines, in addition to their cost advantages, often mean greater energy consumption and more self-consumption of active cooling device, thus it is difficult to take into account overall power generation efficiency of wind turbines.

SUMMARY

An object of embodiments of the disclosure is to provide a generator and a wind turbine, which can improve the cooling effect for the generator and improve the power generation efficiency of the wind turbine.

Embodiments of the present disclosure provide a generator, including an active cooling loop and a passive cooling loop that are isolated from each other and both are in communication with external environment. The active cooling loop includes cavities that are in communication with each other and located at two respective ends of the generator in an axial direction, an air gap between a rotor and a stator of the generator, and radial channels arranged at intervals and distributed along the axial direction of the stator. A cooling device in communication with the external environment is disposed in the active cooling loop. The passive cooling loop includes an axial channel extending through the stator in the axial direction and an outer surface of the generator.

Embodiments of the present disclosure provide a wind turbine, including: any of the above described generators, wherein the generator includes an upper wind side and a bottom wind side in an axial direction; a hub which is disposed at the upper wind side of the generator and is coaxially disposed with the generator, wherein the hub drives the generator to rotate through rotation of an impeller mounted on an outer periphery of the hub; and a nacelle which is disposed at the bottom wind side of the generator, wherein the nacelle is provided with an air inlet and an air outlet pipe communicating with the cooling device of the generator.

The generator and the wind turbine according to the embodiments of the disclosure are provided with the active cooling loop and the passive cooling loop that are isolated from each other. Compared to a generator with only a passive cooling loop, the active cooling loop provides compensation for insufficient cooling capacity within a limited space. Compared to a generator with only an active cooling loop, the passive cooling loop dissipates some of heat from the generator, alleviates the burden of the active cooling loop and reduces the operating power and self-consumed power of the cooling device in the active cooling loop, thereby reducing the volume and weight of the cooling device and improving the power generation efficiency of the wind turbine.

BRIEF DESCRIPTION OF THE DRAWINGS

The disclosure can be better understood from the following description of specific implementations of the disclosure in conjunction with the accompanying drawings.

Other features, objects and advantages of the disclosure will be more apparent by reading the following detailed description, taken together with the drawings, wherein identical or like reference symbols in the various drawings indicate identical or like elements.

Figure 1:
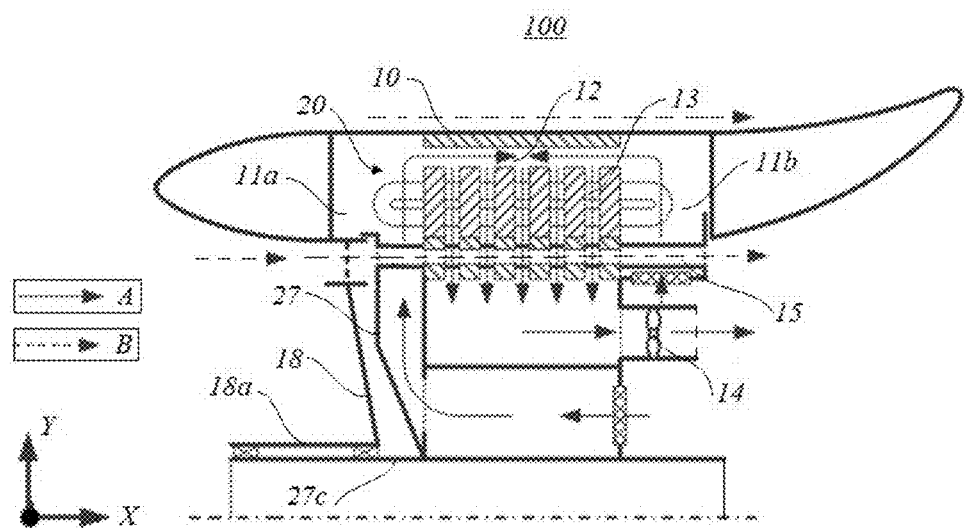
FIG. 1 is a partial cross-sectional view of a generator according to embodiments of the disclosure.

REFERENCE SIGNS IN THE DRAWINGS 10 rotor;
10a rotor yoke;
10b permanent magnet;
11a, 11b cavity;

12 air gap;
13 radial channel;
14 cooling device;
15 axial channel;
15a stator axial channel;
16 radial filter;
17 axial filter;
18 rotor frame;
18a rotating shaft;
18b supporting rib;
20 stator;
21 core assembly;
22 yoke portion;
22a through hole;
22b rib;
22c mounting slot;
23 tooth portion;
23a tooth slot;
24 sleeve;
25 filler strip;
26 windings;
27 stator frame;
27a first end plate;
27b second end plate;
27c fixing shaft;
1 first tube;
2 second tube;
28a first partition;
28b second partition;
1a air inlet;
1b air inlet;
1c air outlet;
29 third partition;
29a first chamber;
29b second chamber;
30 guide device;
30a outer generatrix of guide device;
30b inner generatrix of guide device;
40 acceleration device;
40a outer generatrix of acceleration device;
40b inner generatrix of acceleration device;
100 generator;
110 upper wind side;
120 bottom wind side;
200 hub;
300 nacelle;
310 air inlet;
320 air outlet pipe;
A active cooling loop;
B passive cooling loop;
X axial direction;
Y radial direction;
Z circumferential direction;
R1, R2 branch;
C environment air;
C' environment air over outer surface of generator;
C1 first air flow;
C2 second air flow;
C3 third air flow;
C4 fourth air flow;
C5 fifth air flow;
P1, P2 pressure;
ΔP pressure difference.

DETAILED DESCRIPTION

Features in various aspects and exemplary embodiments of the disclosure are described in detail below. In the following detailed description, numerous specific details are set forth in order to help thorough understanding of the disclosure. However, it is obvious to those skilled in the art that the disclosure may be implemented without some of these specific details. The following descriptions of the embodiments are merely intended to provide better understanding of the disclosure by illustrating examples of the disclosure. The disclosure is not limited to any specific configuration and algorithm presented hereinafter; and any modification, replacement and improvement of elements, members and algorithms are covered in the scope of the disclosure without departing from the spirit of the disclosure. In the drawings and the following description, well-known structures and techniques are not illustrated to avoid unnecessarily obscuring the disclosure.

Exemplary implementations are now described more thoroughly with reference to the accompanying drawings. However, the exemplary implementations can be implemented in a plurality of forms and should not be construed as being limited to the implementations described herein. On the contrary, these implementations are provided to make the disclosure more comprehensive and complete, and fully convey the ideas of the exemplary implementations to a person skilled in the art. For clarity, the dimensions of some of the structures may be exaggerated. Furthermore, the features, structures, or characteristics described hereinafter may be combined in any suitable manner in one or more embodiments.

With reference to FIG. 1, embodiments of the disclosure provide a generator 100, which includes an active cooling loop A and a passive cooling loop B that are isolated from each other and both are in communication with external environment.

The active cooling loop A includes cavities 11a and 11b that are in communication with each other and located at two respective ends of the generator in an axial direction X, an air gap 12 between a rotor 10 and a stator 20 of the generator, and radial channels 13 arranged at intervals and distributed along the axial direction X of the stator 20. A cooling device 14 in communication with the external environment is disposed in the active cooling loop A, as shown with solid arrows in FIG. 1.

The passive cooling loop B includes an axial channel 15 extending through the stator 20 in the axial direction X and an outer surface of the generator 100, as shown with dotted arrows in FIG. 1.

The generator 100 may be an inner stator, i.e., the rotor 10 is disposed around an outer periphery of the stator 20. The generator 100 may also be an outer stator, i.e., the stator 20 is disposed around an outer periphery of the rotor 10. The stator 20 is fixed to a fixing shaft 27c through a stator frame 27. The rotor 10 is fixed to a rotating shaft 18a through a rotor frame 18. The rotating shaft 18a and the fixing shaft 27c are supported by bearings to realize relative rotation. The stator frame 27 and the rotor 10 form a dynamic seal connection, and further form the cavities 11a and 11b at two respective ends of the generator 100 in the axial direction. The generator 100 may be driven in a direct drive manner, a semi-direct drive manner, or a doubly fed manner, etc., which will not be described in detail.

The embodiments of the disclosure construct a main structure of the generator 100 by providing the active cooling loop A and the passive cooling loop B that are structurally isolated from each other. The active cooling loop A is in communication with the external environment, the cooling medium is air in the external environment. The cooling medium is circulated in the loop through the cooling device 14. This cooling loop provides active cooling for the generator 100. The passive cooling loop B is also in communication with the external environment. Through the ingenious construction of the rotor 10 of the generator 100 and natural flow of air in the external environment, the air in the external environment is introduced into the cooling loop. Such cooling loop provides passive cooling for the generator. The cooling mediums in the active cooling loop A and the passive cooling loop B that are structurally isolated from each other to collectively cool the generator 100, and the two cooling loops are thermally isolated.

The generator 100 according to the embodiments of the disclosure is provided with an active cooling loop A and a passive cooling loop B that are isolated from each other. Compared to a generator with only a passive cooling loop, the active cooling loop provides compensation for insufficient cooling capacity within a limited space. Compared to a generator with only an active cooling loop, the passive cooling loop dissipates some of heat from the generator, alleviates the burden of the active cooling loop and reduces the operating power and self-consumed power of the cooling device 14 in the active cooling loop A, thereby reducing the volume and weight of the cooling device 14 and improving the power generation efficiency of the wind turbine.

Specific structure of the generator 100 is described in further detail below with reference to the drawings.

Figure 2:
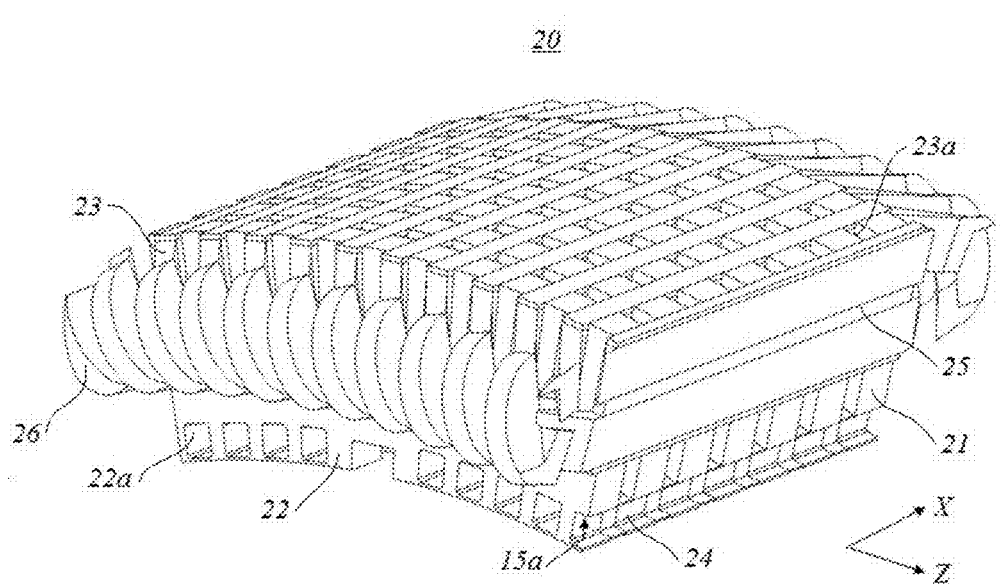
FIG. 2 is a partial schematic diagram of a stator of a generator in FIG. 1.
Figure 3:
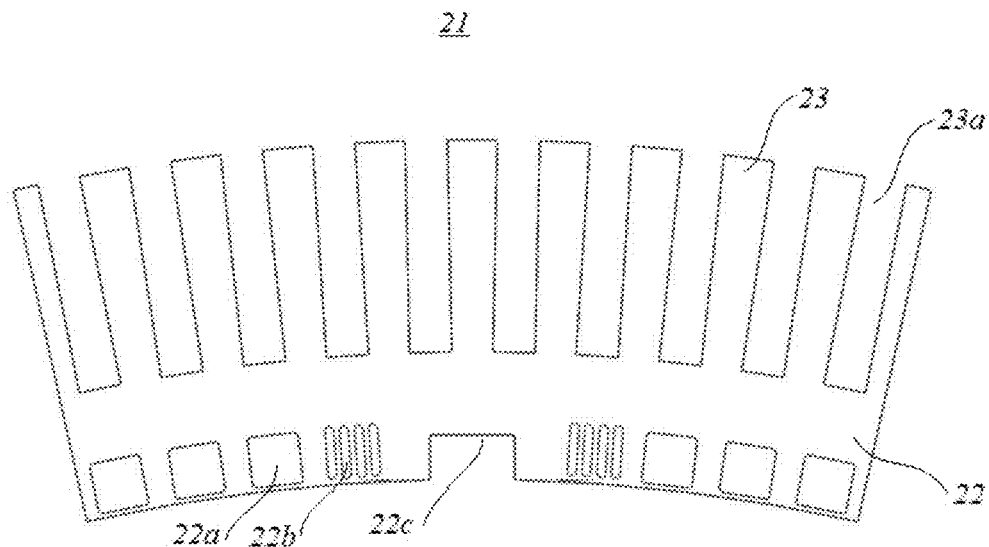
FIG. 3 is a partial structural schematic diagram of a core assembly of a stator in FIG. 2.

With reference to FIG. 2 and FIG. 3, the stator 20 of the generator 100 includes a plurality of core assemblies 21 arranged at intervals in the axial direction X. Each core assembly 21 is formed by a plurality of iron cores laminated in the axial direction X. The radial channels 13 are formed between each adjacent two of core assemblies 21.

The axial channel 15 includes a stator axial channel 15a that extends through the core assemblies 21 in the axial direction X. Each core assembly 21 includes a yoke portion 22 and a tooth portion 23 integrally formed with the yoke portion 22. The tooth portion 23 is provided with a plurality of tooth slots 23a arranged at intervals in a circumferential direction Z of the core assembly 21. The yoke portion 22 is provided with through holes 22a corresponding to the tooth slots 23a. Sleeves 24 communicating with the through holes 22a are disposed between adjacent core assemblies 21. The through holes 22a and the sleeves 24 form the stator axial channel 15a. Further, the tooth slots 23a of the core assemblies 21 correspond one-to-one and extend in the axial direction X. Each tooth slot 23a is provided with a filler strip 25. The filler strip 25 and the tooth slot 23a enclose a space in which windings 26 are disposed. The yoke portion 22 is further provided with at least one mounting slot 22c for fixing the stator 20 to the stator frame 27. The tooth slots 23a and the through holes 22a are provided correspondingly. It is beneficial to reduce the resistance of the air flow in the radial channel 13, to provide a relatively short heat transfer path between the windings 26 and the through holes 22a, and to improve the heat transfer efficiency for the windings 26.

There are one or more through holes 22a. The one or more through holes 22a are arranged at intervals in the circumferential direction Z of the core assembly 21. The one or more through holes 22a are any of square hole, round hole and polygonal hole.

Further, there are one or more sleeves 24, which are provided in one-to-one correspondence with the through holes 22a. The sleeves 24 allow the through holes 22a of the yoke portions 22 of the core assemblies 21 to form a continuous stator axial channel 15a, and also support and limit the core assemblies 21, as shown in FIG. 2. The sleeve 24 may be any of square tube, round tube and polygonal tube.

In an optional embodiment, a rib 22b is disposed in one or more through holes 22a. Such arrangement is beneficial to increase the heat dissipation area of the stator axial channel 15a, thereby improving the cooling effect, as shown in FIG. 3.

Further, an axial section of the through holes 22a constituting the stator axial channel 15a shown in FIG. 3 is completely formed in the yoke portion 22 of the core assembly 21.

In an optional embodiment, each core assembly 21 includes an attachment portion (not shown) disposed close to the yoke portion 22 in the radial direction Y, and the through hole 22a may also be disposed in the attachment portion. Then, the axial section of the through hole 22a may be completely formed outside the yoke portion 22 of the core assembly 21 through the attachment portion.

In an alternative embodiment, the through hole 22a includes two portions distributed along the radial direction Y, one of which is disposed in the yoke portion 22 and the other is disposed in the attachment portion. The axial section of the through hole 22a then may include a part formed in the yoke portion 22 of the core assembly 21 and another part formed outside the yoke portion 22 of the core assembly 21 through the attachment portion.

It should be noted that for the inner stator, the through hole 22a in the yoke portion 22 is located radially inward of the tooth slot 23a, and for the outer stator, the through hole 22a in the yoke portion 22 is located radially outward of the tooth slot 23a. Furthermore, although the stator 20 shown in FIG. 2 adopts a distributed forming double-layer winding structure, the winding structure according to the disclosure may also be but not limited to other winding structures such as concentrated windings, scattered windings and single layer windings.

The structure of the active cooling loop A and the passive cooling loop B of the generator and the cooling process for the generator will be described below with an example in which the generator is an inner stator.

Figure 4:
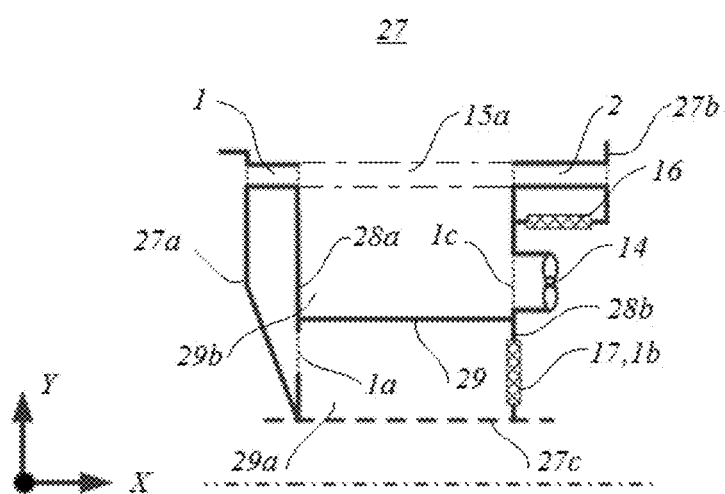
FIG. 4 is a partial cross-sectional view of a stator frame in a generator in FIG. 1.

With reference to FIG. 4, a stator 20 is fixed to a fixing shaft 27c through a stator frame 27. The stator frame 27 includes fixing parts, ring-shaped plates and accessories mounted on the ring-shaped plates. The ring-shaped plate includes a first end plate 27a and a second end plate 27b opposite to each other along the axial direction X. The first end plate 27a is provided with a first tube 1 extending through the first end plate 27a, and the second end plate 27b is provided with a second tube 2 extending through the second end plate 27b. The axial channel 15 further includes the first tube 1 and the second tube 2 communicating with the stator axial channel 15a. Preferably, the first tube 1, the second tube 2, the inner wall of the sleeve 24 and the through hole 22a have same axial cross-section dimension and shape. The passive cooling loop B is isolated from the active cooling loop A through the first tube 1, the sleeves 24 and the second tube 2.

The stator frame 27 further includes a first partition 28a and a second partition 28b that are coaxially disposed between the first end plate 27a and the second end plate 27b. The first partition 28a and the second partition 28b are both hermetically connected to the yoke portion 22 and fixed to the fixing shaft 27c. The first end plate 27a and the first partition 28a are hermetically connected at their inner sides in the radial direction Y of the generator 100. A radial filter 16 is disposed between the second end plate 27b and the second partition 28b.

The first partition 28a is provided with an air inlet 1a. The second partition 28b is provided with an air inlet 1b and an air outlet 1c. Between the first partition 28a and the second partition 28b, a first chamber 29a and a second chamber 29b are separated by a third partition 29. The air inlets 1a, 1b communicate with the first chamber 29a. The air outlet 1c communicates with the second chamber 29b. The cooling device 14 is disposed outside the air outlet 1c. An axial filter 17 is provided at the air inlet 1b of the second partition 28b.

Figure 5:
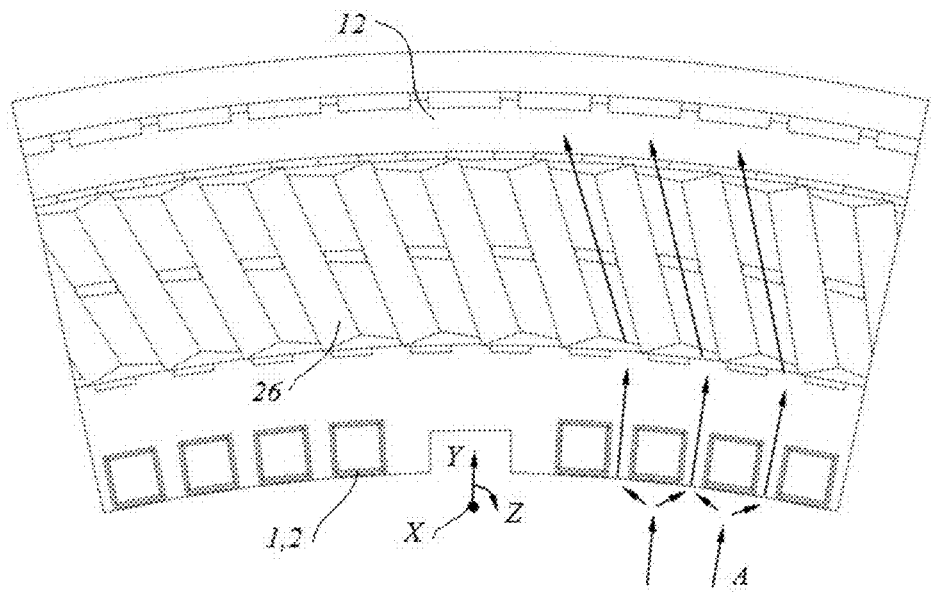
FIG. 5 is a schematic diagram of airflow distribution of a cavity of an active cooling loop in FIG. 1.

With reference to FIG. 5, since the end cavities 11a and 11b of the generator 100 have similar airflow conditions, FIG. 5 may be adopted to describe the airflow in the two cavities. Taking the cavity 11a as an example, the airflow entering the cavity 11a first flows through the first tube 1 via the gap in the first tube 1, and then flows through ends of the windings 26 via gaps between the ends of the windings 26. Finally, the airflow in the cavity 11a flows into the air gap 12 through an inlet at an end of the air gap 12. The airflow in the cavity 11a cools the ends of the windings 26 as it flows through the ends of the windings 26. Some of the airflow distribution in the cavity 11a is shown with solid arrows in FIG. 5.

Figure 6:
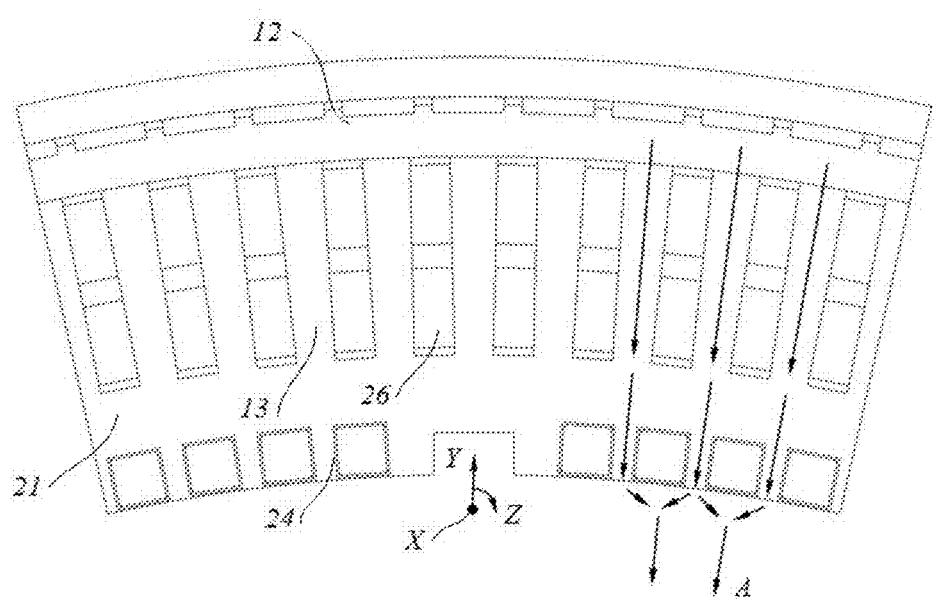
FIG. 6 is a schematic diagram of airflow distribution of a radial channel of an active cooling loop in FIG. 1.

With reference to FIG. 6, the airflow in the radial channel 13 is split from the airflow in the air gap 12. The split airflow first passes through the tooth slots 23a in the radial channels 13 which are formed by the gaps between in-slot segments of the windings 26, and then enters the yoke portions 22 in the radial channels 13 and finally exits the radial channels 13 through the gaps between the sleeves 24 in the radial channel 13. The airflow in the radial channels 13 flows through and cools both the ends of the windings 26 and the core assemblies 21.

Figure 7:
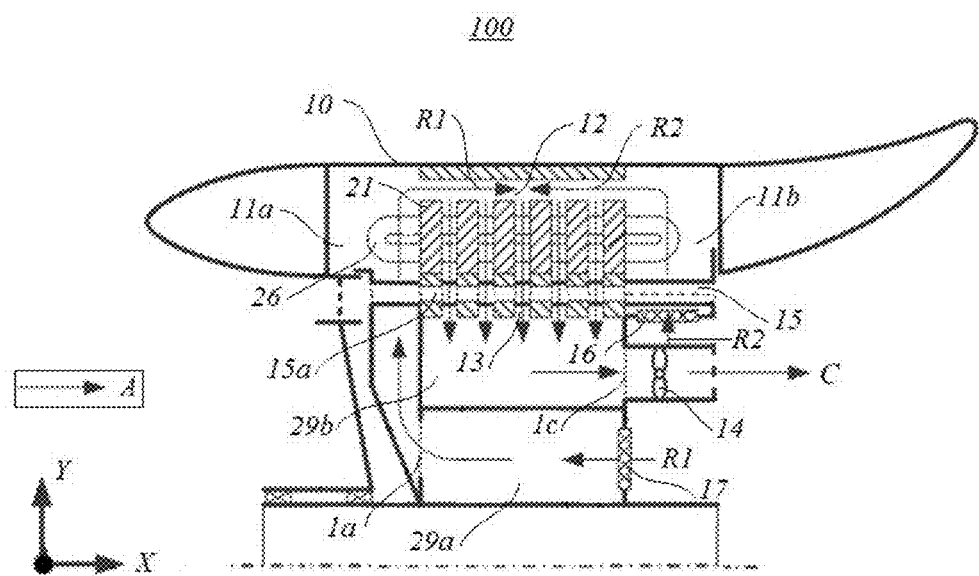
FIG. 7 is a schematic diagram of airflow distribution of an active cooling loop of a generator in FIG. 1.

With reference to FIG. 7, a schematic diagram of airflow distribution of the active cooling loop A of the generator 100 is shown. Environment air C, which is driven by the cooling device 14, is split into two branches R1, R2 which enter the cavities 11a, 11b at the axial ends of the generator 100, respectively. After entering the first chamber 29a through the axial filter 17, the branch R1 moves around the first tube 1 and enters the cavity 11a at one end. The other branch R2 enters the cavity 11b at the other end through the radial filter 16, and moves around the second tube 2. The two branches R1, R2 after entering the cavities 11a, 11b successively flow through the windings 26, the rotor 10 and the core assemblies 21 along the active cooling loop A, and then move around the sleeves 24 and enter the second chamber 29b and are discharged through the cooling device 14, as shown with solid arrows in FIG. 7.

Thus, during the flowing process of the airflow in the active cooling loop A from the inflow at the cavities 11a, 11b to the outflow at the radial channel 13, the airflow cools the ends of the windings 26, the in-slot segments of the windings 26, the core assemblies 21 and the rotor 10 respectively. Except for some of heat from the stator that is dissipated by the passive cooling loop B, the active cooling loop A dissipates other heat from the stator. Also, except for some of heat from the rotor that is dissipated by the passive cooling loop B, the active cooling loop A dissipates other heat from the rotor.

Figure 8:
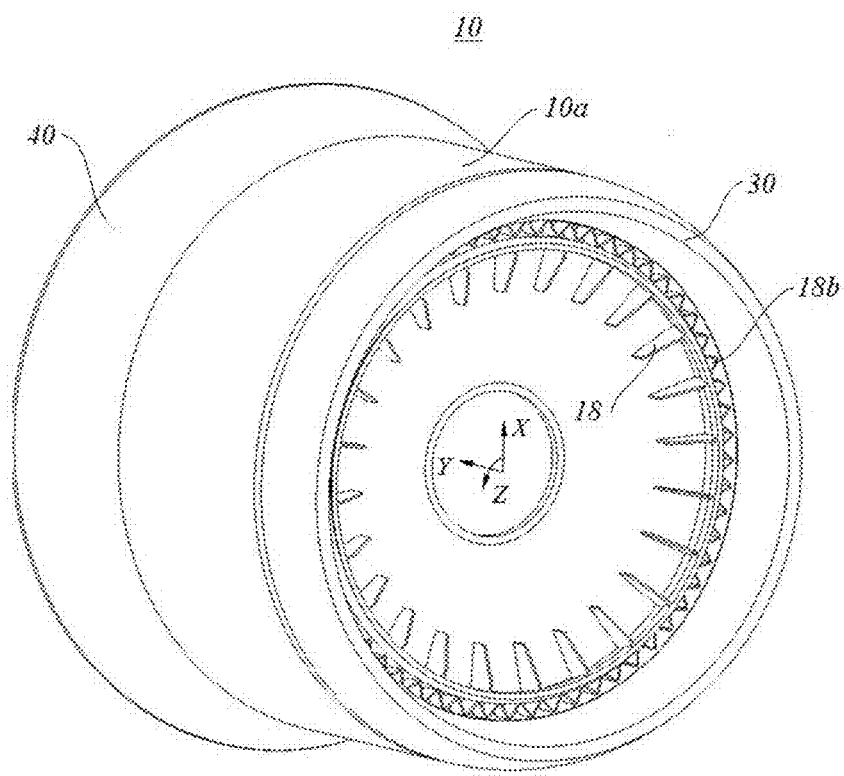
FIG. 8 is a schematic structural diagram of a rotor of a generator in FIG. 1.
Figure 9:
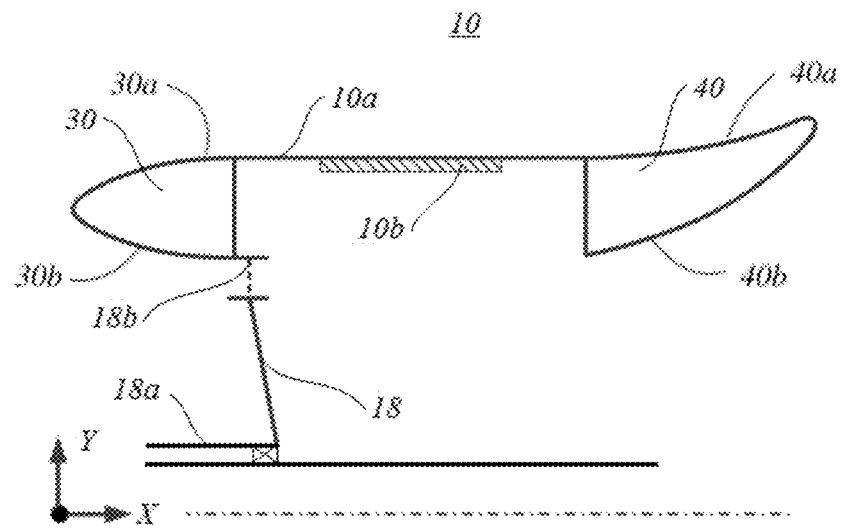
FIG. 9 is a partial cross-sectional view of a rotor of a generator in FIG. 1.

With reference to FIG. 8 and FIG. 9, the rotor 10 is fixed to the rotating shaft 18a through the rotor frame 18. The rotor 10 includes a rotor yoke 10a and a permanent magnet 10b mounted on the rotor yoke 10a. Between the rotor frame 18 and the rotor yoke 10a, a plurality of supporting ribs 18b are provided at intervals in the circumferential direction Y. An annular gap is formed between the supporting ribs 18b, such that environment air may flow from the first end plate 27a side to the second end plate 27b side through the annular gap. The supporting rib 18b is adapted to connect the rotor frame 18 and the rotor yoke 10a, such that the rotor frame 18 and the rotor yoke 10a may simultaneously rotate with the rotating shaft 18a.

The generator 100 includes an upper wind side and a bottom wind side along the axial direction X. The upper wind side is a side where the first end plate 27a is located, and the bottom wind side is a side where the second end plate 27b is located.

The rotor yoke 10a is provided with a guide device 30 disposed at a same side as the first end plate 27a along the axial direction X. The environment air is guided and redirected by the guide device 30. The guide device 30 has an annular thin-wall structure which belongs to a streamlined style in aerodynamics. Specifically, the guide device 30 is a thin-walled revolving body with a hollow interior to reduce weight. A cross section of the guide device 30 along its radial direction Y includes an outer generatrix 30a and an inner generatrix 30b intersecting each other. A latitude circle radius of the outer generatrix 30a gradually decreases in a direction away from the rotor yoke 10a along the axial direction X. A latitude circle radius of the inner generatrix 30b gradually increases in a direction away from the rotor yoke 10a along the axial direction X. At least one of the outer generatrix 30a and the inner generatrix 30b may be a curve or a straight line. Preferably, an outer diameter of the outer generatrix 30a at a side near the rotor yoke 10a is equal to an outer diameter of the generator 100, such that the environment air can flow smoothly over the outer surface of the generator 100. The outer generatrix 30a and the inner generatrix 30b may be arranged symmetrically or asymmetrically, depending on actual situation of the environment air.

Furthermore, the rotor yoke 10a is further provided with an acceleration device 40 at a same side as the second end plate 27b in the axial direction X. The acceleration device 40 is a thin-walled revolving body with a hollow interior to reduce weight. A cross section of the acceleration device 40 along its radial direction Y includes an outer generatrix 40a and an inner generatrix 40b intersecting each other. Both a latitude circle radius of the outer generatrix 40a and a latitude circle radius of the inner generatrix 40b gradually increase in a direction away from the rotor yoke 10a along the axial direction X. At least one of the outer generatrix 40a and the inner generatrix 40b may be a curve or a straight line. Preferably, an outer diameter of the outer generatrix 40a at a side near the rotor yoke 10a is equal to an outer diameter of the generator 100, such that the environment air can flow smoothly over the outer surface of the generator 100.

A cooling process of the passive cooling loop B for the generator 100 will be described below, in which the generator 100 including both the guide device 30 and the acceleration device 40 is taken as an example.

Figure 10:
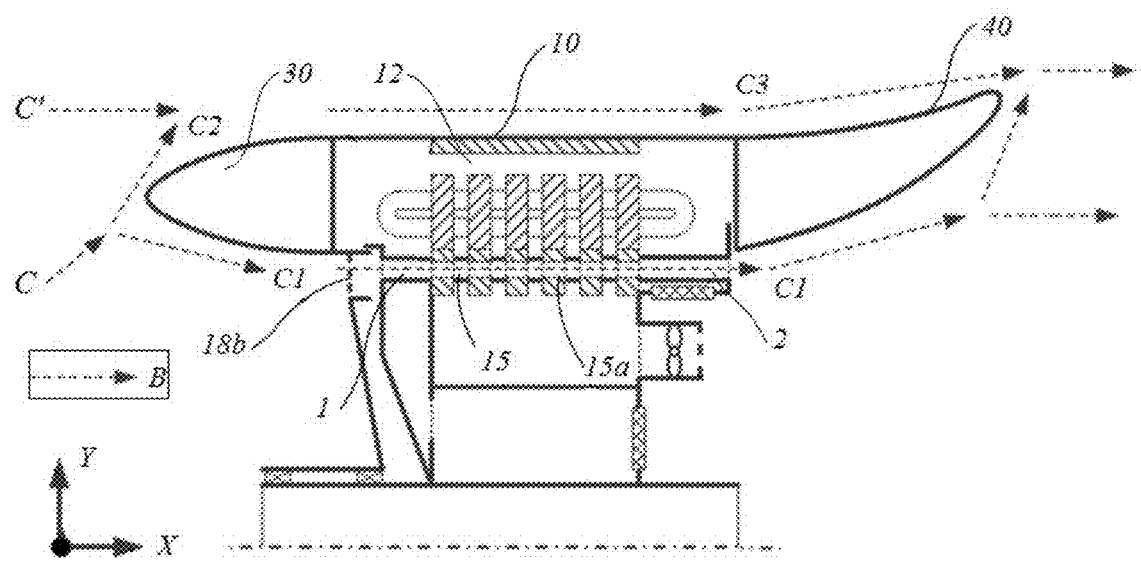
FIG. 10 is a schematic diagram of airflow distribution of a passive cooling loop of a generator in FIG. 1.
Figure 11:
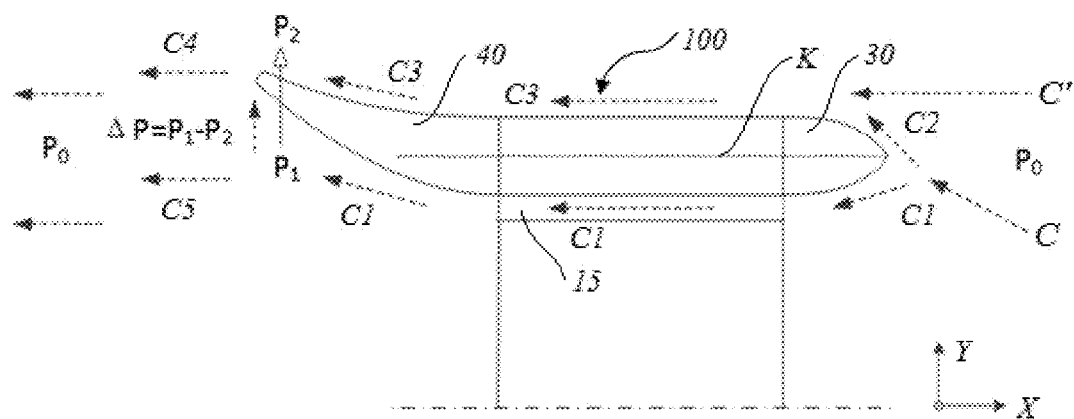
FIG. 11 is a schematic diagram of operation principle of a guide device and an accelerating device of a rotor in FIG. 8.

With reference to FIG. 10 and FIG. 11, the environment air C is split into a first air flow C1 and a second air flow C2 when passing through the guide device 30. The first air flow C1 enters the axial channel 15 through the annular gap, flows through the stator 20 and then moves around the acceleration device 40. The second air flow C2 merges with environment air C' over the outer surface of the generator 100 to form a third air flow C3, which abuts the outer surface of the rotor yoke 10a along the axial direction X and moves around the acceleration device 40. The first air flow C1 and the third air flow C3 generate a pressure difference ΔP between an interior and an exterior of the acceleration device 40, which drives the first air flow C1 and the third air flow C3 to further flow, as shown with dotted arrows in FIG. 10.

As shown in FIG. 11, during the cooling process of the passive cooling loop B for the generator 100, the operation principle of the guide device 30 is described as follows: upstream incoming air at the upper wind side of the generator 100 can be schematically split into two parts: incoming air inside a chord line K of the guide device 30 and incoming air outside the chord line K. A static pressure of the upstream incoming air at the upper wind side is atmospheric pressure P0. When the upstream incoming air at the upper wind side flows inside the chord line K of the guide device 30, the incoming air is redirected to form environment air C. When the environment air C further flows downstream to the vicinity of the guide device 30, it is split into a first air flow C1 and a second air flow C2. The first air flow C1 flows towards inside of the chord line K. The second air flow C2 flows towards outside of the chord line K. The split first air flow C1 flows through the fluid guide device 30 and then enters the axial channel 15 of the generator 100. The split second air flow C2 merges with the environment air C' outside the chord line K to form a third air flow C3, which flows over the outer surface of the rotor yoke 10a along the axial direction X.

The guide device 30 have the following functions in the process of splitting the air flow. The curved structure inside the chord line K of the guide device 30 can capture more environment air C, such that more environment air C is redirected toward inside of the chord line K, such that the stator 20 with more heat is provided with more cooling air. The curved structure outside the chord line K can allow the second air flow C2, which is split from the air C and flows towards the outside of the chord line K, to reduce flow separation due to sudden change in flow cross-section area, and allow the second air flow C2 to merge with the environment air C' outside the chord line K to form a third air flow C3, which abuts and flows over the outer surface of the rotor yoke 10a, such that a better cooling effect for the rotor 10 may be obtained.

Further, during the cooling process of the passive cooling loop B for the generator 100, the operation principle of the acceleration device 40 is described as follows: the first air flow C1 flowing out of the axial channel 15 of the generator 100 further flows downstream inside the acceleration device 40, and the third air flow C3 flowing over the outer surface of the rotor yoke 10a further flows downstream outside the acceleration device 40. During the flowing process of the first air flow C1 inside the acceleration device 40, its flow cross-section area gradually increases, and its static pressure gradually increases to P1. During the flowing process of the third air flow C3 outside the acceleration device 40, its flow cross-section area gradually decreases, and its static pressure gradually decreases to P2. Therefore, a pressure difference ΔP=P1−P2 is formed between the airflow flowing inside the acceleration device 40 and the airflow flowing outside the acceleration device 40, which has a direction from the inside to the outside of the acceleration device 40. The pressure difference ΔP increases the driving force for the first air flow C1 in its flowing process, such that more environment air C is redirected to the inside of the chord line K of the guide device 30, and thereby the passive cooling loop B has improved branch cooling capacity for cooling the stator 20. Due to the acceleration device 40, a part of the first air flow C1 further flows downstream to form a fifth air flow C5, and the other part is redirected towards outside of the acceleration device 40 and merges with the third air flow C3 outside the acceleration device 40 to form a fourth air flow C4. As the fourth air flow C4 and the fifth air flow C5 further flow downstream at the bottom wind side, the airflow will gradually restore equilibrium along with the automatic adjustment of the static pressure, and the static pressure of the downstream airflow at the bottom wind side finally returns to atmospheric pressure P0.

It should be understood that the generator 100 according to the embodiments of the disclosure may only include the guide device 30 or the acceleration device 40, or may include both the guide device 30 and the acceleration device 40. The guide device 30 and the acceleration device 40 disposed at the inlet and the outlet of the passive cooling loop further improve the cooling capacity of the passive cooling loop among the active and passive cooling loops.

Accordingly, the first air flow C1 in the passive cooling loop B cools the stator as it flows through the axial channel 15, and dissipates some of heat from the stator which is generated in the operation of the generator 100. The third air flow C3 cools the rotor 10 as it flows over the outer surface of the rotor yoke 10a, and dissipates some of heat from the rotor which is generated in the operation of the generator 100.

As described above, during the cooling process for the generator 100, the airflows in the two cooling loops are isolated from each other by the first tube 1, the sleeve 24, and the second tube 2. The first tube 1, the sleeve 24 and the second tube 2 serve as common components of the two cooling loops except the heat sources, and provide thermal insulation between the airflows in the two cooling loops.

Preferably, the first tube 1 includes an inner wall and an outer wall that are thermally conductive. Since the airflows inside and outside the first tube 1 are formed from cold air in the external environment and has not absorbed the heat from the generator 100 in its operation, no heat exchange occurs between the airflows inside and outside the first tube 1 even when the inner wall and the outer wall of the first tube 1 are thermally conductive. Such arrangement can reduce the manufacturing cost of the first tube 1.

Preferably, the second tube 2 includes an inner wall and an outer wall that are thermally isolated. For the second tube 2, the airflow inside the second tube 2 is formed from hot air that has absorbed some of the heat from the stator and is about to be discharged into the external environment, and the airflow outside the second tube 2 is formed from cold air that is introduced into the generator 100 from the external environment. In this case, if the inner wall and the outer wall of the second tube 2 are thermally conductive, the airflow outside the second tube 2 will absorb some of heat from the airflow inside the second tube 2, which will be brought into the subsequent cooling process for the rotor 10 and the stator 20.

Preferably, the sleeve 24 includes an inner wall and an outer wall that are thermally isolated. For the sleeve 24 in the radial channel 13, the airflow outside the sleeve 24 is formed from hot air that has absorbed some of the heat from the stator. The airflow in the sleeve 24 of the radial channel 13 is formed from air that has gradually absorbed some of the heat from the stator and thus changes from cold to hot. In this case, if the inner wall and the outer wall of the sleeve 24 are thermally conductive, the airflow in the upstream sleeve 24 will absorb the heat from the airflow outside the sleeve 24, which will cause the airflow inside the sleeve 24 to adversely affect the subsequent cooling for the downstream portion of the stator 20. Also, the airflow inside the downstream sleeve 24 may absorb some of the heat from the airflow outside the sleeve 24, or may transfer some of the heat to the airflow outside the sleeve 24. When the airflow inside the downstream sleeve 24 absorbs some of the heat from the airflow outside the sleeve 24, same adverse effects are produced as the case in which the airflow in the upstream sleeve 24 absorbs some of the heat from the airflow outside the sleeve 24.

Accordingly, the sleeve 24 and the second tube 2 are provided with the inner and outer walls that are thermally isolated, and the cooling capacity of the active and passive cooling loops of the generator 100 can be maximized.

It should be noted that although the generator with the inner stator is exemplarily described above for convenience, it should be appreciated that, the operation principles of the above active cooling loop A and passive cooling loop B can also be applied to a generator with an outer stator according to exemplary embodiments of the disclosure.

Figure 12:
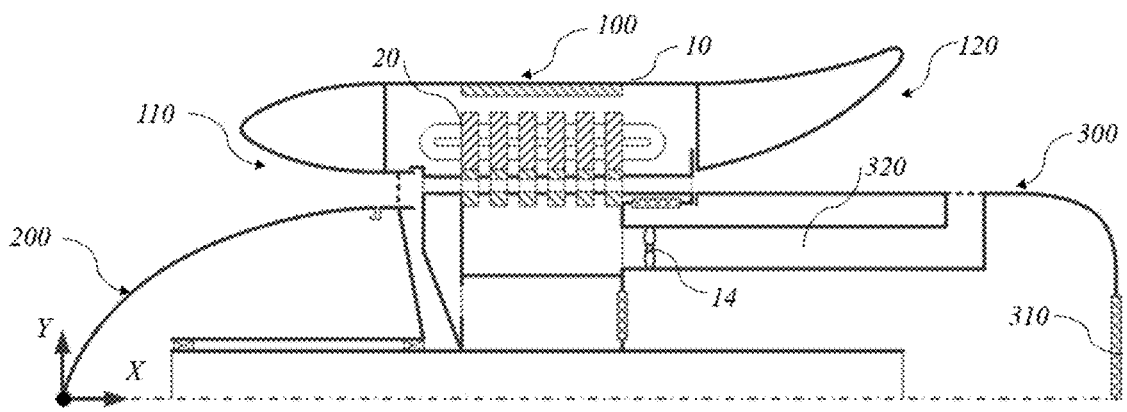
FIG. 12 is a partial cross-sectional view of a wind turbine according to embodiments of the disclosure.

With reference to FIG. 12, embodiments of the disclosure further provide a wind turbine, which includes: any of the above described generators 100, a hub 200, and a nacelle 300.

The generator 100 has an upper wind side 110 and a bottom wind side 120 in an axial direction. The hub 200 is disposed at the upper wind side 110 of the generator 100 and is coaxially disposed with the generator 100. A maximum outer diameter of the hub 200 is smaller than a minimum inner diameter of the axial channel 15 of the generator 100, such that environment air may flow into the axial channel 15. The hub 200 drives the generator 100 to rotate through rotation of an impeller mounted on an outer periphery of the hub 200.

The nacelle 300 is disposed at the bottom wind side 120 of the generator 100. Optionally, an outer contour of the nacelle 300 is radially spaced apart from the axial channel 15 of the generator 100 by a predetermined distance, such that the hot air having absorbed heat in the axial channel 15 may be readily discharged to the external environment. The nacelle 300 is provided with an air inlet 310 and an air outlet pipe 320 communicating with the cooling device 14 of the generator 100. A filter may be provided at the air inlet 310 to block impurities in the environment air.

The wind turbine according to the embodiments of the disclosure, except for converting kinetic energy of wind into electrical energy during the power generation process, also sufficiently uses the heat transfer capacity of wind. Through the construction of the main body structure of the generator 100, two structurally isolated active and passive cooling loops are formed, which reduces the operating power and the self-consumed power of the cooling device 14, improves the power generation efficiency of the wind turbine, reduces the volume and weight of the cooling device 14, saves space of the nacelle 300, realizes the highly integrated structure of the cooling system and the generator, and reduces the cost of the cooling system.

In addition, the generator according to the above-described exemplary embodiments may be applied to various devices including a generator, such as but not limited to wind turbine.

It should be understood by those skilled in the art that, the above embodiments are all exemplary rather than limitative. Different technical features in different embodiments can be combined to achieve beneficial results. Through studying the drawings, the specification and the claims, those skilled in the art should understand and implement other varied embodiments of the disclosed embodiments. In the claims, the term "comprise" does not exclude other devices or steps; the indefinite article "a" or "an" does not exclude a plurality; the terms "first" and "second" are used to indicate a name rather than to indicate any specific order. Any reference numerals in the claims should not be construed as limitation to the scope of protection. The functions of the various parts in the claims can be realized by a single hardware or software module. The presence of certain technical features in different dependent claims does not mean that these technical features cannot be combined to achieve beneficial results.

The invention claimed is:

1. A generator, comprising:
an active cooling loop comprising:
a first cavity and a second cavity that are in communication with each other and located at two respective ends of the generator in an axial direction;
an air gap between a rotor and a stator of the generator; and
radial channels arranged at intervals and distributed along the axial direction of the stator, wherein a cooling device in communication with an external environment is disposed in the active cooling loop; and
a passive cooling loop that is isolated from the active cooling loop, both the passive cooling loop and the active cooling loop being in communication with the external environment, the passive cooling loop comprising:
an axial channel extending through the stator in the axial direction; and
an outer surface of the generator,
wherein the stator comprises a plurality of core assemblies arranged at intervals in the axial direction, and the radial channels are formed between each adjacent two of the core assemblies; and
wherein the axial channel comprises a stator axial channel that extends through the core assemblies in the axial direction, each core assembly comprises a yoke portion and a tooth portion integrally formed with the yoke portion, the tooth portion is provided with a plurality of tooth slots arranged at intervals in a circumferential direction of the core assembly, the yoke portion is provided with through holes corresponding to the tooth slots, sleeves communicating with the through holes are disposed between adjacent core assemblies, and the through holes and the sleeves form the stator axial channel.

2. The generator according to claim 1, wherein the stator is fixed to a fixing shaft through a stator frame, the stator frame comprises a first end plate and a second end plate opposite to each other along the axial direction, the first end plate is provided with a first tube extending through the first end plate, and the second end plate is provided with a second tube extending through the second end plate;
the axial channel further comprises the first tube and the second tube communicating with the stator axial channel, and the passive cooling loop is isolated from the active cooling loop through the first tube, the sleeves and the second tube.

3. The generator according to claim 2, wherein the stator frame further comprises a first partition and a second partition that are coaxially disposed between the first end plate and the second end plate, the first partition and the second partition are both hermetically connected to the yoke portion and fixed to the fixing shaft, the first end plate and the first partition are hermetically connected at their inner sides in a radial direction of the generator, and a radial filter is disposed between the second end plate and the second partition; the first partition is provided with an air inlet, the second partition is provided with an air inlet and an air outlet, a first chamber and a second chamber between the first partition and the second partition are separated by a third partition, the air inlets communicate with the first chamber, the air outlet communicates with the second chamber, the cooling device is disposed outside the air outlet, and an axial filter is provided at the air inlet of the second partition.

4. The generator according to claim 3, wherein environment air, which is driven by the cooling device, is split into two branches which enter the first and second cavities; one of the branches enters the first chamber through the axial filter, moves along the first tube and enters the first cavity at one end; the other of the branches enters the second cavity at the other end through the radial filter and moves along the second tube; the two branches after entering the first and second cavities successively flow through windings, the rotor and the core assemblies along the active cooling loop, and then move along the sleeves and enter the second chamber and are discharged through the cooling device.

5. The generator according to claim 4, wherein the rotor is fixed to a rotating shaft through a rotor frame, the rotor comprises a rotor yoke and a permanent magnet mounted on the rotor yoke; between the rotor frame and the rotor yoke, a plurality of supporting ribs are disposed at intervals in the circumferential direction; and an annular gap is formed between the supporting ribs such that environment air flows from a side of the first end plate to a side of the second end plate through the annular gap.

6. The generator according to claim 5, wherein the rotor yoke is provided with a guide device located at a same side as the first end plate in the axial direction, the guide device is a thin-walled revolving body with a first hollow interior, a cross section of the guide device along the radial direction comprises a first outer generatrix and a second inner generatrix intersecting each other, a latitude circle radius of the first outer generatrix gradually decreases in a direction away from the rotor yoke along the axial direction, and a latitude circle radius of the first inner generatrix gradually increases in a direction away from the rotor yoke along the axial direction.

7. The generator according to claim 6, wherein the rotor yoke is further provided with an acceleration device at a same side as the second end plate in the axial direction, the acceleration device is a thin-walled revolving body with a second hollow interior, a cross section of the acceleration device along the radial direction comprises a second outer generatrix and a second inner generatrix intersecting each other, and both a latitude circle radius of the second outer generatrix and a latitude circle radius of the second inner generatrix gradually increase in a direction away from the rotor yoke along the axial direction.

8. The generator according to claim 7, wherein the environment air is split into a first air flow and a second air flow when passing through the guide device; the first air flow enters the axial channel through the annular gap, flows through the stator and then moves along the acceleration device;

the second air flow merges with environment air over the outer surface of the generator to form a third air flow, which abuts an outer surface of the rotor yoke along the axial direction and moves along the acceleration device; and the first air flow and the third air flow generate a pressure difference between an interior and an exterior of the acceleration device, which drives the first air flow and the third air flow to further flow.

9. The generator according to claim 2, wherein the rotor is fixed to a rotating shaft through a rotor frame, the rotor comprises a rotor yoke and a permanent magnet mounted on the rotor yoke; between the rotor frame and the rotor yoke, a plurality of supporting ribs are disposed at intervals in the circumferential direction; and an annular gap is formed between the supporting ribs such that environment air flows from a side of the first end plate to a side of the second end plate through the annular gap.

10. The generator according to claim 9, wherein the rotor yoke is provided with a guide device located at a same side as the first end plate in the axial direction, the guide device is a thin-walled revolving body with a first hollow interior, a cross section of the guide device along the radial direction comprises a first outer generatrix and a first inner generatrix intersecting each other, a latitude circle radius of the first outer generatrix gradually decreases in a direction away from the rotor yoke along the axial direction, and a latitude circle radius of the first inner generatrix gradually increases in a direction away from the rotor yoke along the axial direction.

11. The generator according to claim 10, wherein the rotor yoke is further provided with an acceleration device at a same side as the second end plate in the axial direction, the acceleration device is a thin-walled revolving body with a second hollow interior, a cross section of the acceleration device along the radial direction comprises a second outer generatrix and a second inner generatrix intersecting each other, and both a latitude circle radius of the second outer generatrix and a latitude circle radius of the second inner generatrix gradually increase in a direction away from the rotor yoke along the axial direction.

12. The generator according to claim 11, wherein the environment air is split into a first air flow and a second air flow when passing through the guide device; the first air flow enters the axial channel through the annular gap, flows through the stator and then moves along the acceleration device;

the second air flow merges with the environment air over the outer surface of the generator to form a third air flow, which abuts an outer surface of the rotor yoke along the axial direction and moves along the acceleration device; and the first air flow and the third air flow generate a pressure difference between an interior and an exterior of the acceleration device, which drives the first air flow and the second air flow to further flow.

13. The generator according to claim 2, wherein the first tube comprises an inner wall and an outer wall that are thermally conductive, the second tube comprises an inner wall and an outer wall that are thermally isolated, and each of the sleeves comprises an inner wall and an outer wall that are thermally isolated.

14. The generator according to claim 2, wherein the first tube comprises an inner wall and an outer wall that are thermally conductive, and the second tube comprises an inner wall and an outer wall that are thermally isolated.

15. The generator according to claim 1, wherein the through holes are disposed in the yoke portion; or each core assembly comprises an attachment portion disposed in the radial direction, and the through holes are disposed in the attachment portion; or each through hole comprises two portions distributed along the radial direction, one of which is disposed in the yoke portion and the other of which is disposed in the attachment portion.

16. The generator according to claim 15, wherein the through holes are arranged at intervals in the circumferential direction of the core assembly, each of the through holes is a square hole, a round hole, or a polygonal hole; or a rib is disposed in at least one of the through holes.

17. The generator according to claim 1, wherein the through holes are arranged at intervals in the circumferential direction of the core assembly, each of the through holes is a square hole; a round hole, or a polygonal hole; or a rib is disposed in at least one of the through holes.

18. The generator according to claim 1, wherein each of the sleeves comprises an inner wall and an outer wall that are thermally isolated.

19. A wind turbine comprising:
a generator, wherein the generator comprises an upper wind side and a bottom wind side in an axial direction, the generator comprises an active cooling loop and a passive cooling loop that are isolated from each other, and both the active cooling loop and the passive cooling loop are in communication with an external environment,
wherein the active cooling loop comprises:
a first cavity and a second cavity that are in communication with each other and located at two respective ends of the generator in an axial direction;
an air gap between a rotor and a stator of the generator; and
radial channels arranged at intervals and distributed along the axial direction of the stator, wherein a cooling device in communication with the external environment is disposed in the active cooling loop;
wherein the passive cooling loop comprises:
an axial channel extending through the stator in the axial direction; and
an outer surface of the generator;
a hub which is disposed at the upper wind side of the generator and is coaxially disposed with the generator, wherein the hub drives the generator to rotate through rotation of an impeller mounted on an outer periphery of the hub; and
a nacelle which is disposed at the bottom wind side of the generator, wherein the nacelle is provided with an air inlet and an air outlet pipe communicating with the cooling device of the generator,
wherein the stator comprises a plurality of core assemblies arranged at intervals in the axial direction, and the radial channels are formed between each adjacent two of the core assemblies; and
wherein the axial channel comprises a stator axial channel that extends through the core assemblies in the axial direction, each core assembly comprises a yoke portion and a tooth portion integrally formed with the yoke portion, the tooth portion is provided with a plurality of tooth slots arranged at intervals in a circumferential direction of the core assembly, the yoke portion is provided with through holes corresponding to the tooth slots, sleeves communicating with the through holes are disposed between adjacent core assemblies, and the through holes and the sleeves form the stator axial channel.

* * * * *